United States Patent
Al Ghamdi et al.

(10) Patent No.: US 12,438,847 B2
(45) Date of Patent: Oct. 7, 2025

(54) SYSTEM AND METHOD FOR INTEGRATING SYSTEMS TO ACCESS WEBSITES BY MANAGED MOBILE DEVICES

(71) Applicant: SAUDI ARABIAN OIL COMPANY, Dhahran (SA)

(72) Inventors: Hafed A. Al Ghamdi, Dammam (SA); Mohammed M. Otaibi, Dammam (SA); Abdullah A. Almutlak, Khobar (SA); Ziyad A. Mubarak, Ras Tannurah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 156 days.

(21) Appl. No.: 18/509,859

(22) Filed: Nov. 15, 2023

(65) Prior Publication Data

US 2025/0158964 A1    May 15, 2025

(51) Int. Cl.
  *H04L 9/40*    (2022.01)
(52) U.S. Cl.
  CPC ...... *H04L 63/0272* (2013.01); *H04L 63/0236* (2013.01); *H04L 63/0263* (2013.01)

(58) Field of Classification Search
  CPC ............ H04L 63/0236; H04L 63/0272; H04L 63/0263
  See application file for complete search history.

(56) References Cited

U.S. PATENT DOCUMENTS

| | | | |
|---|---|---|---|
| 9,270,765 B2 * | 2/2016 | Narayanaswamy | H04L 63/20 |
| 10,728,246 B2 * | 7/2020 | Bansal | H04L 67/10 |
| 10,986,504 B1 * | 4/2021 | Smith | H04W 12/08 |
| 11,700,239 B2 * | 7/2023 | Yin | H04L 63/0272 726/15 |
| 11,968,179 B2 * | 4/2024 | Negrea | H04L 67/10 |
| 12,101,247 B2 * | 9/2024 | Vysotsky | H04L 12/2854 |
| 12,284,158 B2 * | 4/2025 | Howe | H04L 63/0227 |
| 2023/0367833 A1 * | 11/2023 | Kol | H04L 63/0876 |

\* cited by examiner

*Primary Examiner* — Mohammad A Siddiqi
(74) *Attorney, Agent, or Firm* — Leason Ellis LLP

(57) ABSTRACT

Network systems integration and method inspect network traffic to enable secure access to internal and Internet websites from managed mobile devices. The integrated networks system implements a secure split tunneling to allow users of mobile devices managed by an organization Mobile Device Management system to securely browse only safe websites on the Internet or on an intranet resource of the organization. The system includes an internal firewall, a reception firewall, internal and external web application firewalls, a reverse proxy, an Internet proxy, and an enterprise mobility management system having a VPN-Tunnel system to implement the secure split tunneling method.

15 Claims, 7 Drawing Sheets

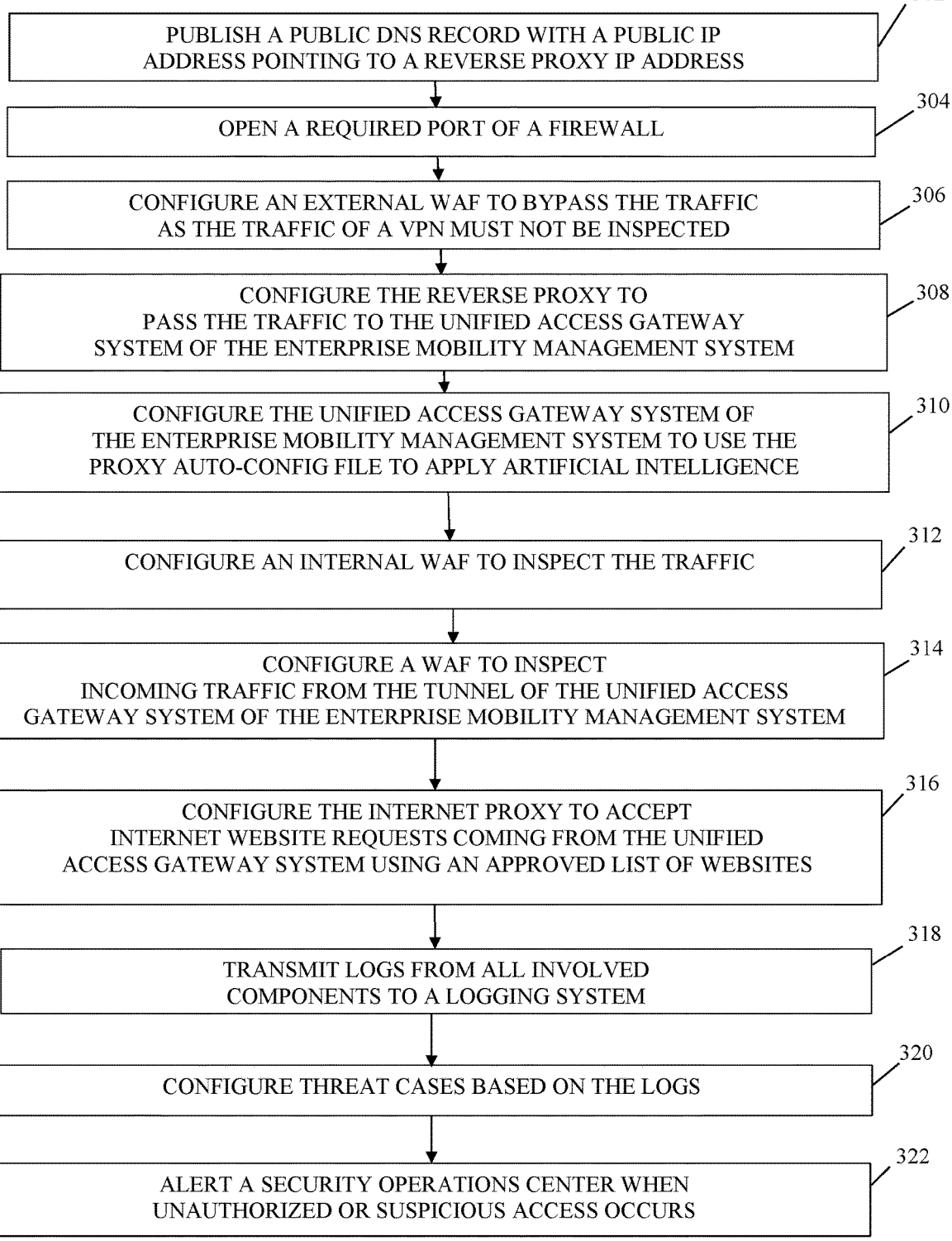

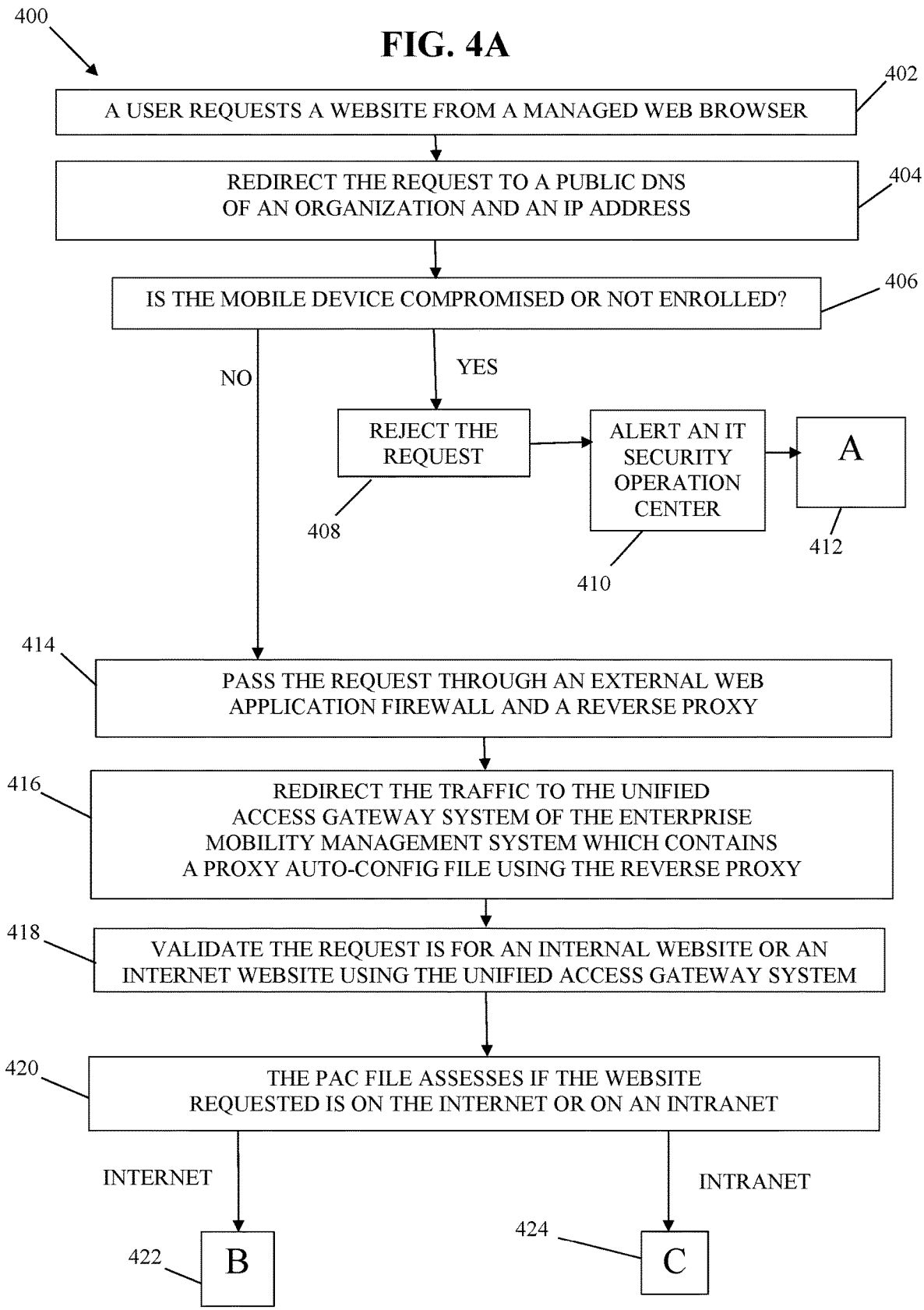

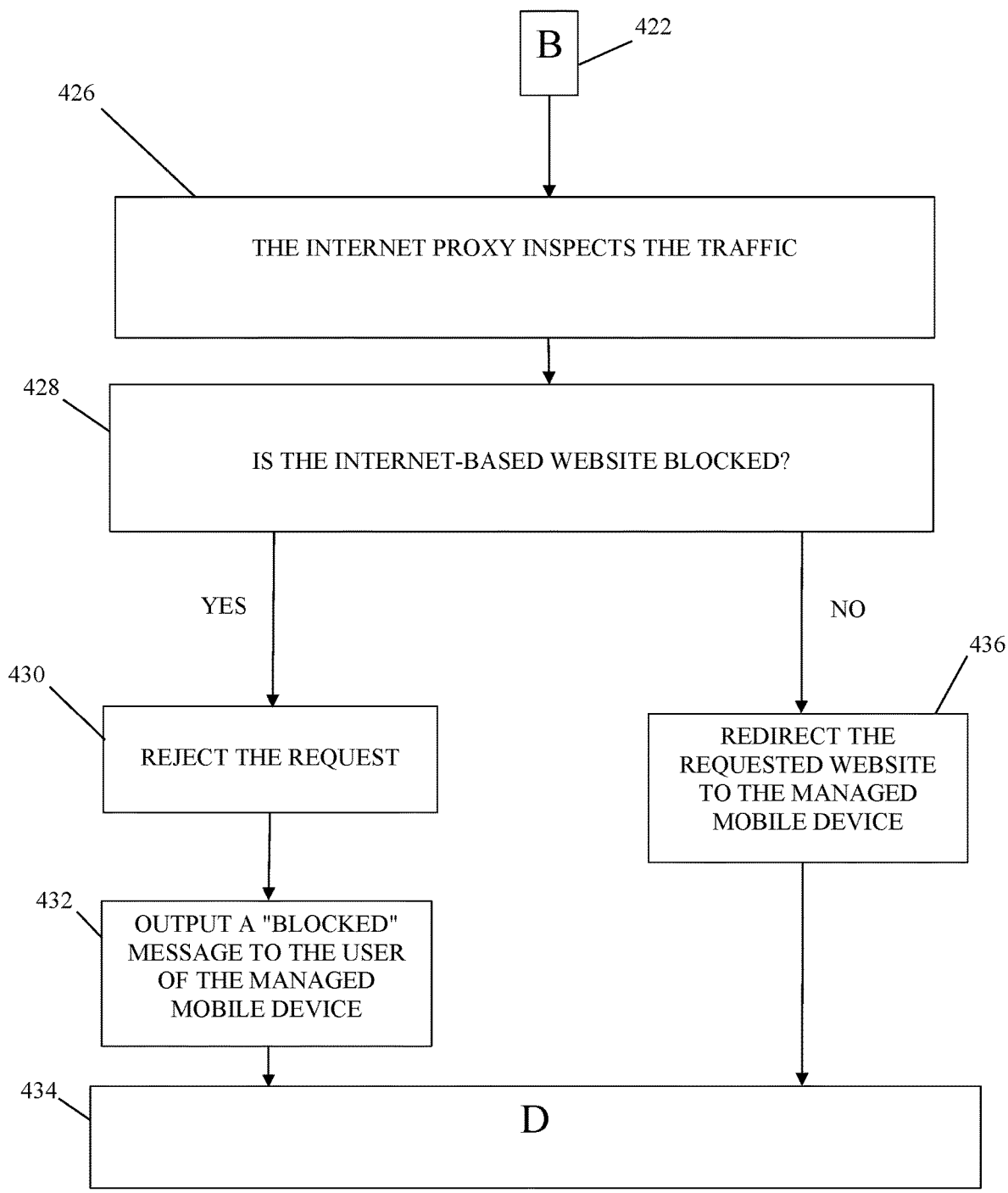

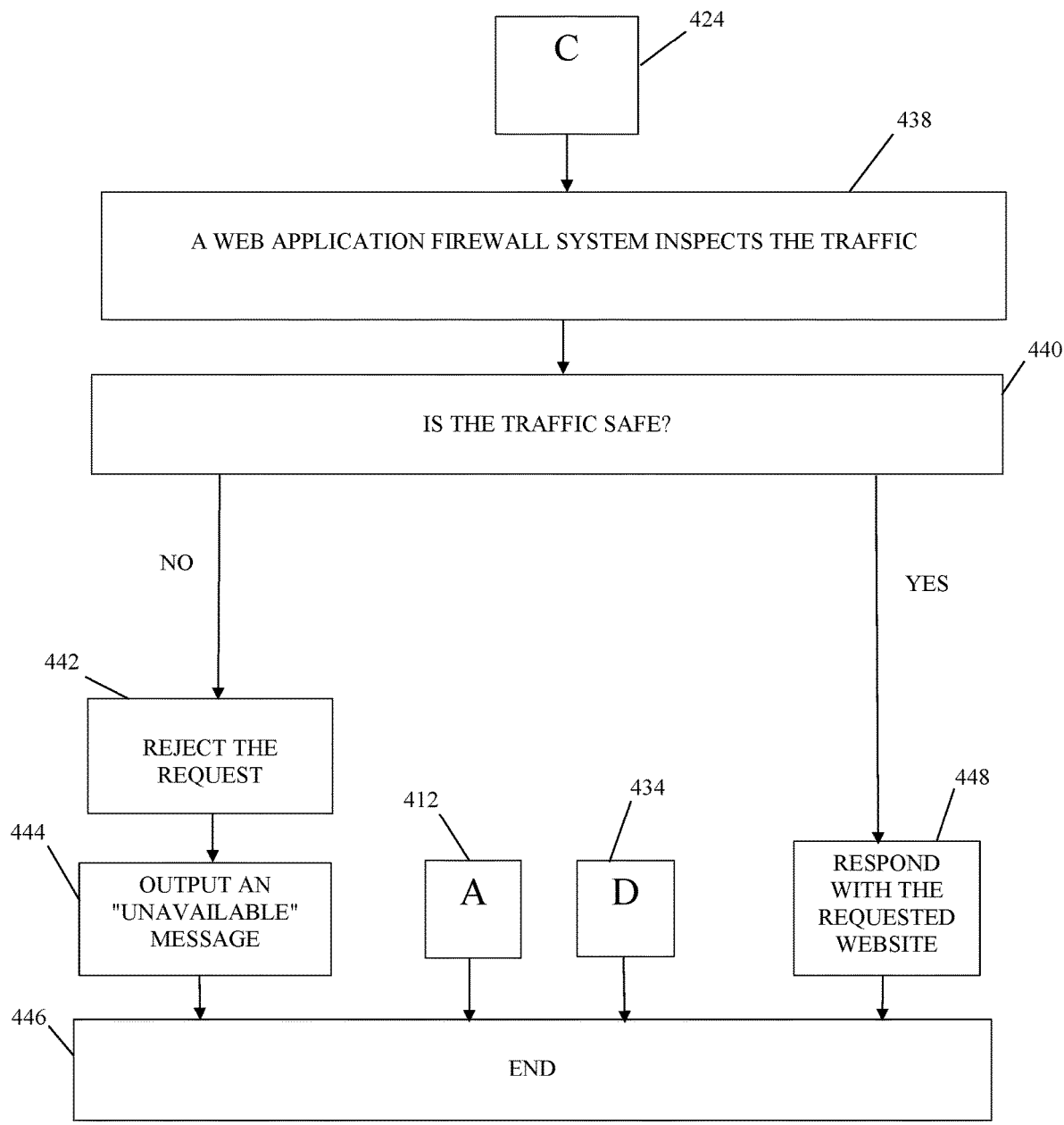

SYSTEM AND METHOD FOR INTEGRATING SYSTEMS TO ACCESS WEBSITES BY MANAGED MOBILE DEVICES

FIELD OF THE DISCLOSURE

The present disclosure relates to integrating systems, and more particularly, to integrating systems along with a method to securely access internal network websites and Internet websites through managed mobile devices using a single web browser.

BACKGROUND OF THE DISCLOSURE

Cybersecurity is a crucial issue for an organization. Significant resources may be needed to prevent malware and malicious websites from invading the computing systems of the organization through mobile devices used by users in the organization. Browsing websites can have an important role for information gathering by users in the organization. However, an incautious user of a mobile device can inadvertently infect the organization with harmful software. Organizations must put into place systems to mitigate the risk of accessing such malware and malicious websites, lest such malware and malicious websites expose internal resources to outsiders, or otherwise harm the organization, its infrastructure, and its image.

One approach has a user in an organization utilizing two different browsers, with one browser functioning solely to access internal websites on an intranet of the organization. A second browser is used to access external websites on the Internet employing a very limited security configuration of the second browser. Such dual browsers bring inconvenience to the user of using two different browsers especially when adopting a Bring Your Own Device (BYOD) concept. For instance, if the user is restricted to accessing links received in an email to be opened in the browser app used for an intranet website, the user will not be able to open these Internet websites. Instead, the user must copy the link and paste it in the browser that is enabled to browse Internet websites. It gets more inconvenient if Data Leakage Prevention (DLP) is enabled on the mail client, as the user will have to type the Internet website in the browser dedicated for Internet websites manually.

SUMMARY OF THE DISCLOSURE

In this present disclosure, multiple systems are integrated together along with a method to allow users accessing internal and external websites using a single web browser managed by a Mobile Device Management (MDM) system. To achieve this, two innovative aspects are implemented to ensure user convenience as well as maintaining data protection and security.

The first aspect employs a logical identification of user web request and redirects the traffic to internal or Internet websites. This is achieved using a customizable Proxy Auto-Config (PAC) file configured on a virtual private network (VPN) Tunnel system. The VPN-Tunnel system can include a VPN-Tunnel server. Each web request coming from mobile devices is assessed to determine if the requested website is a local fully qualified domain name (FQDN) or external Internet FQDN, and redirect the request accordingly to either an internal or external website. If the website requested coming from managed mobile devices is one of the whitelisted safe Internet websites, such as www-.google.com, on an Internet proxy system, then the user will be able to access it. The Internet proxy system should be configured to receive the web requests from mobile users and redirect these requests to only approved and safe websites. Otherwise, a webpage will be presented indicating the website request is blocked. If the requested website is an internal website, such as https://home.company.com, then the request will be redirected to the internal website through an internal web application firewall (WAF) for inspection and ensuring only allowed websites can be accessed by the user. This has been illustrated in FIG. 1.

The second aspect is related to securing the internal websites accessed from managed mobile devices by the introduction of the Internal WAF appliance to inspect the traffic and ensure only certain internal websites can be accessed, such as https://home.company.com, as shown in FIG. 2. Any traffic coming to the VPN-Tunnel should not be inspected by any security appliance including an external WAF until the request is received and processed by the VPN-Tunnel server, otherwise the VPN-Tunnel system will consider the request compromised and untrusted, and then it will be dropped. Therefore, introducing another internal WAF after the traffic is decrypted by the VPN-Tunnel will be a solution to ensure the request is safe and the requested internal website is whitelisted. The internal WAF can inspect the traffic for security checks and ensures only certain internal websites can be accessed from managed mobile devices.

In an embodiment, a method comprises providing a comprehensive integrated system operatively connected to an internal web server configured as a private network device storing an internal website, operatively connected to an Internet Proxy configured to allow users accessing Internet website, such as www.google.com, and operatively connected to a mobile device managed by the enterprise Mobile Device Management (MDM) system and configured with a browser that redirect user website requests to an internal or external web resource, wherein the integrated system includes a reception firewall, an external WAF, an internal WAF, a reverse proxy, the enterprise MDM system including a VPN-Tunnel system that supports Proxy Auto-Config (PAC) scripts in the form of a PAC file, an internal firewall, and Internet proxy configured to allow access to whitelisted Internet websites. The method further comprises receiving the request at the integrated systems from the managed mobile device, and passing the request through the reception firewall, the external WAF without decryption to the Reverse Proxy. The method also comprises validating the request, using the PAC file hosted on the MDM system or a VPN-Tunnel system, for the case that the request is directed to the internal web server to access the internal website or directed to the external public web server to access the Internet website such as www.google.com. The method then achieves a secure split tunneling method for managed mobile devices using only one browser deployed using MDM system. Utilizing MDM System is essential to ensure only managed devices and authorized users can access the corporate network as well as ensure the mobile device used for this access is not compromised.

First the user will request the website from a managed mobile device, and the request will be redirected to a public domain name system (DNS) of the organization and to an Internet Protocol (IP) address. The method can further comprise, prior to validating the request, redirecting traffic between the mobile device and the internal and external websites through the VPN Tunnel. The method can further comprise choosing either the Internet proxy or the internal WAF using the PAC configurations hosted on the VPN Tunnel. The method can further comprise, in the case that an Internet website is requested, determining the case that an Internet-based website is requested then redirect the traffic to the Internet proxy to ensure the website is not blocked and fetch the requested website to the mobile device. In the case that an internal website is requested, determining the case that an intranet-based website is requested, then the traffic will be redirected to internal WAF for inspection and to ensure the website is allowed to access and fetch the requested website to the mobile device.

In an embodiment, an integrated networks system is operatively connected to an internal web server configured as a private network device storing an internal website, operatively connected to an external web server configured as a public network device storing an external website, and operatively connected to a mobile device configured to send a request to access to the internal and external websites. The integrated networks system comprises a reception firewall, an external web application firewall (WAF), a reverse proxy, an enterprise mobility management (EMM) system, an Internet proxy, an external firewall, an internal WAF, and an internal firewall. The reception firewall is operatively connected to the mobile device. The external WAF is operatively connected to the reception firewall. The reverse proxy is operatively connected to the external WAF. The EMM system is operatively connected to the reverse proxy, and includes a VPN-Tunnel system configured to validate the request, and a proxy auto-config (PAC) system. The Internet proxy is operatively connected to the EMM system. The external firewall is operatively connected to the Internet proxy, and is operatively connected to the external web server. The internal WAF is operatively connected to the EMM system. The internal firewall is operatively connected to the internal WAF and to the internal web server. The PAC system is configured to choose one of the Internet proxy and the reverse proxy. The internal firewall, the reception firewall, the external and internal WAFs, the EMM system, the Internet proxy, and the reverse proxy are configured to implement a secure split tunneling of the mobile device to the internal and external web servers. A single browser connection is established between the mobile device and one of the internal and external web servers, thereby permitting access by the mobile device to one of the internal and external websites using only the single browser by the secure split tunneling.

The internal web server can be configured to be a network device of an intranet of an organization. The external web server can be configured to be a network device of the Internet. The VPN-Tunnel system can be configured to validate the case that the request is directed to the internal web server to access the internal website. The VPN-Tunnel system can be configured to validate the case that the request is directed to the external web server to access the external website. The PAC system can include a PAC file. The EMM system can be configured to execute the PAC file. The EMM system, executing the PAC file, can automatically choose one of the reverse proxy and the Internet proxy to obtain a Uniform Resource Locator (URL) of the internal website or the external website, respectively.

In another embodiment, a method comprises providing an integrated networks system operatively connected to an internal web server configured as a private network device storing an internal website, operatively connected to an external web server configured as a public network device storing an external website, and operatively connected to a mobile device configured to send a request to access to the internal and external websites, wherein the integrated networks system includes an internal firewall, a reception firewall, an external web application firewall (WAF), an internal WAF, an Internet proxy, a reverse proxy, and an enterprise mobility management (EMM) system including a VPN-Tunnel system and a proxy auto-config (PAC) system. The method also comprises receiving the request at the integrated networks system, and passing the request through the reception firewall, the external WAF, and the reverse proxy.

The method further includes validating the request, using the VPN-Tunnel system, for the case that the request is directed to the internal web server to access the internal website or directed to the external web server to access the external website. The method also includes implementing a secure split tunneling of the mobile device to the internal and external web servers, and accessing the internal and external websites by the mobile device using only one browser.

The method can further comprise determining the case that the mobile device is compromised or not enrolled with the integrated networks system, and rejecting the request. The method can further comprise determining the case that the mobile device is not compromised and is enrolled with the integrated networks system, and redirecting the request to a public domain name system (DNS) of the organization and to an Internet Protocol (IP) address. The method can further comprise, prior to validating the request, redirecting traffic between the mobile device and the internal and external servers to the VPN-Tunnel system. The method can further comprise choosing one of the Internet proxy and the reverse proxy using the PAC system.

The method can further comprise storing a PAC file in the PAC system, executing the PAC file by the EMM system, automatically choosing one of the reverse proxy and Internet proxy, and obtaining a Uniform Resource Locator (URL) of the internal website or the external website, respectively. The method can further comprise, in the case that the Internet proxy is chosen, determining the case that an Internet-based website is not blocked, and redirecting the requested website to the mobile device. The method can further comprise in the case that the reverse proxy is chosen, determining the case that the traffic is safe, and responding to the request with the requested website sent to the mobile device.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIG. 3 is a flowchart of a method of initially configuring the system of FIG. 1.

FIGS. 4A-4C are flowcharts of a method of operation of the system of FIG. 1.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system and method for integrating systems to access websites by managed mobile devices. The system and method implement split tunneling in computer networks, which allows a user to access dissimilar security domains such as a public network and a local area network (LAN) or a wide area network (WAN) at the same time using a single mobile browser, and using the same or different network connections. The public network can be the Internet, and the LAN or WAN can be an intranet of an organization.

Using the system and method, multiple systems are integrated together along with a method to allow users accessing internal and external websites using a single web browser managed by a Mobile Device Management (MDM) system. To achieve this, two innovative aspects are implemented to ensure user convenience as well as maintaining data protection and security.

Redirecting Traffic to Internal or Internet Websites

Figure 1:
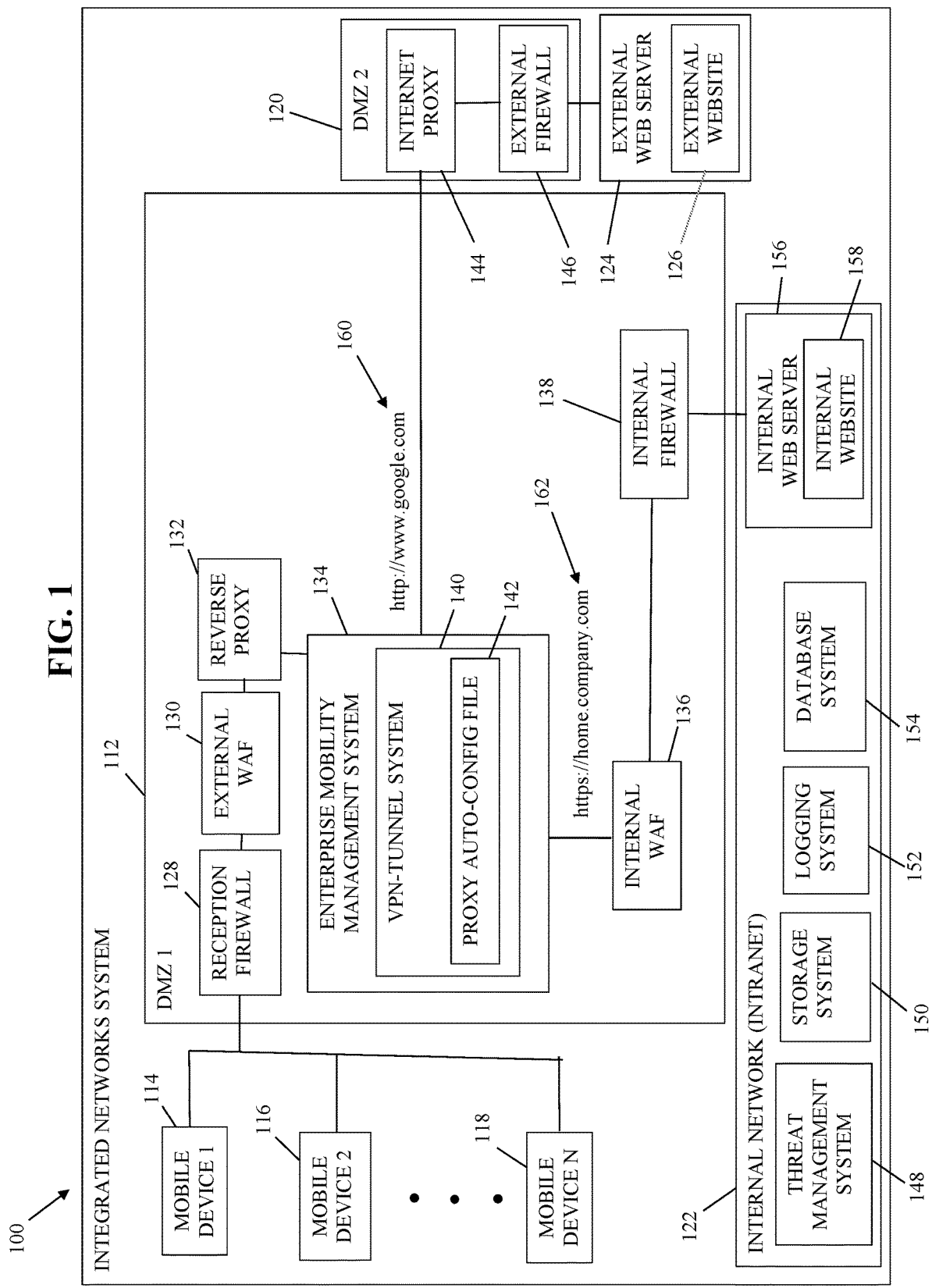
FIG. 1 is a schematic of logical identification of user web request, according to an embodiment.

As illustrated in FIG. 1, according to a first aspect of the present disclosure, the system is configured as described next to employ a logical identification of user web request to redirect the traffic to internal or Internet websites. This is achieved using a customizable Proxy Auto-Config (PAC) file configured on a virtual private network (VPN) Tunnel system. The VPN-Tunnel system can include a VPN-Tunnel server. Each web request coming from mobile devices is assessed to determine if the requested website is a local fully qualified domain name (FQDN) or external Internet FQDN, and redirect the request accordingly to either an internal or external website. If the website requested coming from managed mobile devices is one of the whitelisted safe Internet websites, such as www.google.com, on an Internet proxy system, then the user will be able to access it. The Internet proxy system should be configured to receive the web requests from mobile users and redirect these requests to only approved and safe websites. Otherwise, a webpage will be presented indicating the website request is blocked. If the requested website is an internal website, such as https://home.company.com, then the request will be redirected to the internal website through an internal web application firewall (WAF) for inspection and ensuring only allowed websites can be accessed by the user.

Perform Inspection of Internal Websites

Figure 2:
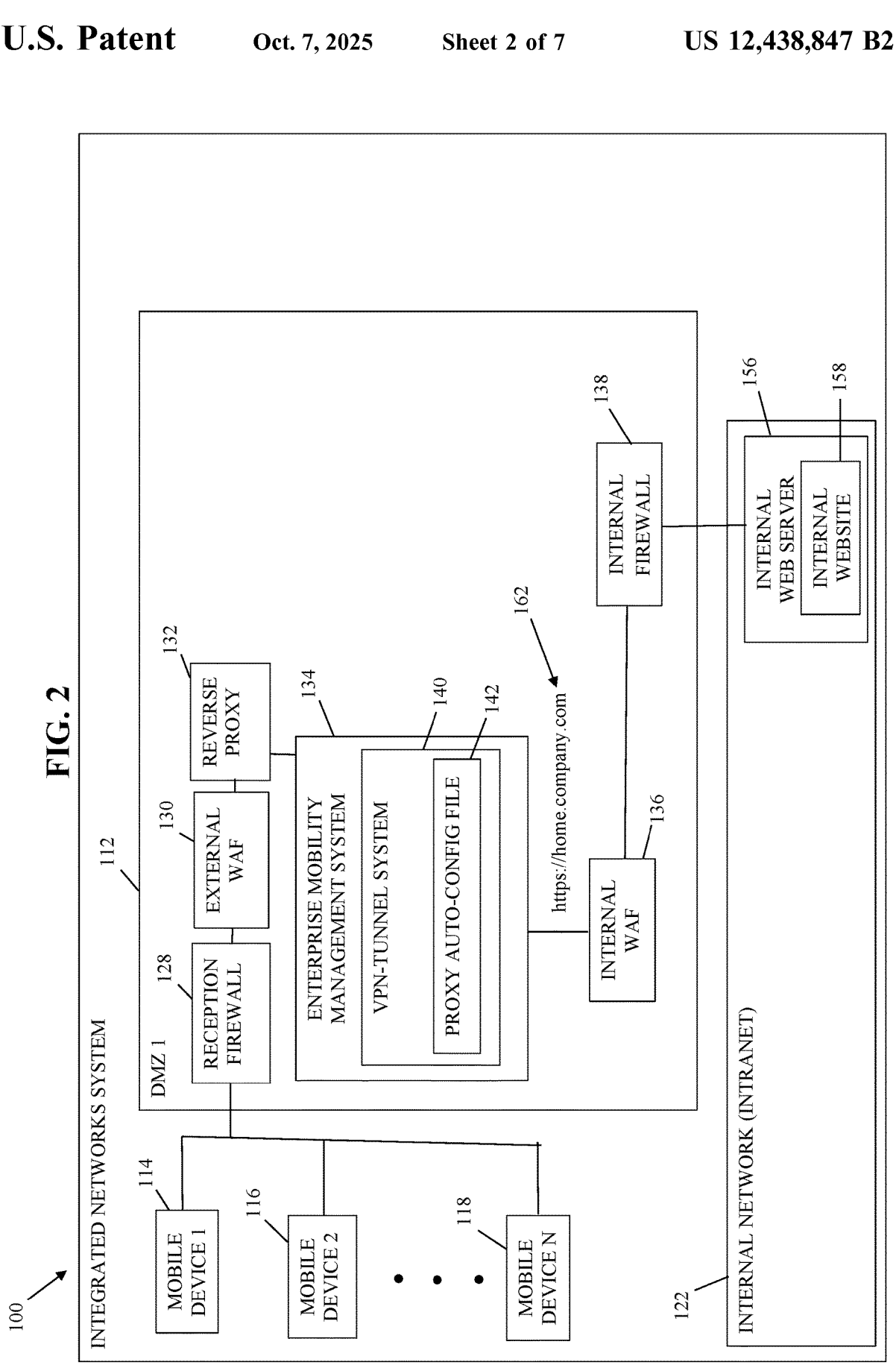
FIG. 2 is a schematic of securing internal websites, according to the embodiment.

As illustrated in FIG. 2, according to a further aspect of the present disclosure, the system is configured as described next to secure the internal websites accessed from managed mobile devices by the introduction of the Internal WAF appliance to inspect the traffic and ensure only certain internal websites can be accessed, such as https://home.company.com. Any traffic coming to the VPN-Tunnel should not be inspected by any security appliance including an external WAF until the request is received and processed by the VPN-Tunnel server, otherwise the VPN-Tunnel system will consider the request compromised and untrusted, and then it will be dropped. Therefore, introducing another internal WAF after the traffic is decrypted by the VPN-Tunnel will be a solution to ensure the request is safe and the requested internal website is whitelisted. The internal WAF can inspect the traffic for security checks and ensures only certain internal websites can be accessed from managed mobile devices.

Implementation of the Integrated Networks System

As shown in FIGS. 1-2, an integrated networks system 100 has a first demilitarized zone (DMZ 1) 112 operatively connected to at least one mobile device 114, 116, 118; operatively connected to a second demilitarized zone (DMZ 2) 120; and operatively connected to an internal network 122. Each mobile device 114, 116, 118 includes a processing having code therein to execute a mobile browser. Each mobile device 114, 116, 118 can be a laptop, a smartphone, or a tablet. The internal network 122 can be a network of an organization. The internal network 122 can be an intranet. The second DMZ 120 is operatively configured to access an external web server 124 configured to allow access to an external website 126. The integrated networks system 100 controls access to and inspects network traffic between network devices including but not limited to the at least one mobile device 114, 116, 118, the DMZs 112, 120, and the internal network 122.

The first DMZ 112 includes a reception firewall 128, an external web application firewall (WAF) 130, a reverse proxy 132, an enterprise mobility management (EMM) system 134 which acts as a mobile device management (MDM) system, an internal WAF 136, and an internal firewall 138. The EMM system 134 further includes a VPN-Tunnel system 140. The VPN-Tunnel system 140 includes a system implemented by a Proxy Auto-Config (PAC) file 142. In one embodiment, the PAC file 142 includes at least one script. In another embodiment, the PAC file 142 can be a PAC rule base hosted by a server executing code configured to automatically choose a proxy server or the Internal WAF. Upon choosing the proxy server or Internal WAF, the integrated networks system 100 fetches a Universal Resource Locator (URL) or Internal websites 158. The EMM system 134 is operatively connected to the reverse proxy 132 and to the internal WAF 136. The second DMZ 120 includes an Internet proxy 144 and an external firewall 146. The external firewall 146 is configured to allow the traffic reaching to the external web server 124. The internal network 122 includes a threat management system 148, a storage system 150, a logging system 152, a database system 154, and an internal web server 156 configured to store an internal website 158. The internal web server 156 is operatively connected to the internal firewall 138.

Each of the components of the integrated networks system 100, such as the mobile devices 114, 116, 118, the first DMZ 112, the second DMZ 120, the internal network 122, the external web server 124, the reception firewall 128, the external WAF 130, the reverse proxy 132, the EMM system 134, the internal WAF 136, the internal firewall 138, the VPN-Tunnel system 140, the PAC file 142, the Internet proxy 144, the external firewall 146, the threat management system 148, the storage system 150, the logging system 152, the database system 154, and the internal web server 156 shown in FIG. 1 can be operatively connected using any known network.

The memory, processors, and storage can be implemented based on the size of the organization or enterprise and based on vendor recommendations for all components including a firewall, a WAF, an Internet proxy, the Enterprise Mobility Management system, the VPN-Tunnel system, etc.

Referring back to FIGS. 1-2, each mobile device 114, 116, 118 can be any device running the ANDROID, IOS, or WINDOWS Operating Systems. Each mobile device 114, 116, 118 must have Internet connectivity and support Mobile Device Management. Each mobile device 114, 116, 118 can include a display configured to display the websites 158 accessed through the integrated networks system 100. Alternatively, each mobile device 114, 116, 118 can include a speaker configured to output audio associated with the websites 158 as well as audible messages to the user, such as an audible error message. Each mobile device 114, 116, 118 includes a secure browser maintained by or published by an organization to allow users in the organization to access the websites 158 on the web servers 156 through the Internet or through the intranet 122 of the organization, respectively. The organization can be a corporate entity, an educational institution, a governmental institution, a healthcare institution, or any other entity which can maintain websites on an intranet. The DMZs 112, 120 of the integrated networks system 100 can be DMZs of the organization, acting as an intermediary between the mobile devices 114, 116, 118 and the web servers 156 operatively connected to the Internet or the intranet 122, respectively.

Implementation of the Method of Operation

As shown in FIG. 3, a method 300 uses the foregoing hardware to implement the first aspect providing a logical identification of user web request and redirecting the traffic to internal or Internet websites, and to implement the second aspect of securing the internal websites accessed from managed mobile devices by the introduction of the Internal WAF appliance to inspect the traffic and ensure only certain internal websites can be accessed.

The integrated networks system 100 is initially configured by the method 300 including the step 302 of publishing a public domain name system (DNS) record with a public Internet Protocol (IP) address pointing to an IP address of the reverse proxy 32. The method 300 then opens a required port of the reception firewall 28 in step 304, and configures the external WAF 30 in step 306 to bypass the traffic as the traffic of a virtual private network (VPN) must not be inspected.

The method 300 then configures the reverse proxy 132 to pass the traffic to the VPN-Tunnel system 140 of the EMM system 134 in step 308. The VPN-Tunnel system 140 is responsible for providing access to websites 158 using the secure organization browser installed or published on the mobile devices 114, 116, 118. The VPN-Tunnel system 140 is then configured to use the PAC file 142 in step 310 to apply artificial intelligence (AI) to automatically choose the proxy server or the Internal WAF. Upon choosing the proxy server or Internal WAF, the integrated networks system 100 fetches a Universal Resource Locator (URL) or Internal websites 158 using the artificial intelligence implemented by the PAC file 142. In an example embodiment, the artificial intelligence is implemented by an AI module executed by the VPN-Tunnel system 140 in the form of coded rules stored in the PAC file 142 such as if-then-else statements. The artificial intelligence can include a neural network, a support vector machine (SVM), or any other known artificial intelligence and machine learning system and method.

The PAC file 142 can be in any known programming language or script, such as JAVASCRIPT. In an example embodiment, the PAC file 142 can include the following code:

```
function FindProxyForURL(url, host)
{
    if (shExpMatch(url, "*.internal-domain.com*"))
// intranet website requests will be directed to the intranet domain
        return DIRECT;
// to limit access to specific websites where the traffic should be enforced
// to pass through an internal WAF appliance for security inspection
    else
        return "PROXY proxy.internal-domain.com.sa:port";
// Internet website requests will be directed to the Internet proxy to
// ensure only approved websites can be accessed
}
```

The method 300 configures the internal WAF 136 to inspect the traffic in step 312. The method 300 then configures the internal WAF 136 to inspect incoming traffic from the tunnel of the VPN-Tunnel system 140 of the EMM system 134 in step 314, such as requests to access internal websites 158 such as https://home.company.com 162, and configures the Internet proxy 144 in step 316 to accept Internet website requests coming from the VPN-Tunnel system 140 using an approved list or whitelist of websites, such as https://www.google.com 160. The method 300 transmits logs from all involved components of the integrated networks system 100 to a logging system 152 in step 318. The logging system 152 can include a memory configured to store the logs. Alternatively, the storage system 150 is configured to store the logs. The method 300 then configures threat cases based on the logs in step 320. The threat cases can be stored in the memory of the database system 154, or can be stored in the storage system 150. The method 300 completes the configuration of the integrated networks system 100 by alerting an information technology (IT) security operation center in step 322 when an unauthorized or suspicious access to a website 158 occurs. The IT security operations center can be a component of an organization which operates the integrated networks system 100 and the mobile devices 114, 116, 118. The IT security operations center can be operatively connected to the integrated networks system 100. For example, the threat management system 148 can implement the IT security operations center for the organization.

Once configured by the method 300 in FIG. 3, the integrated networks system 100 operates according to the method 400 shown in FIGS. 4A-4C. In step 402, the method 400 receives a user request for a website 158 from a managed web browser. The user request can be received at the integrated networks system 100 to access a website 158 from a secure browser on a managed mobile device from among the mobile devices 114, 116, 118. For example, the mobile device 114 can be the mobile device employed by the user to send the user request. The method 400 then redirects the request to a public DNS of the organization and to an IP address in step 404. The IP address in step 404 can be an IP address associated with the website 158 to which the user requested access.

The method 400 then determines the case that the mobile device 114 is compromised or is not enrolled in step 406. The integrated networks system 100 can require the user of the mobile device 114 to enroll or register the mobile device 114 to be associated with the user. The threat management system 148 can perform an enrollment or registration procedure to enroll the mobile device 114 and the associated user. The enrollment information corresponding to the mobile device 114 and the associated user can be stored in the storage system 150. The threat management system 148 can also operate any malware detection system known in the art to determine the case that the mobile device 114 is compromised. The threat management system 148 can operate as a real-time monitoring system to define and detect all possible threat cases. The threat management system 148 can configure threat cases based on the logs received at the logging system 152 from all components, as well as the logs stored in the storage system 150 or the database system 154 to alert the IT security operations center when unauthorized or suspicious access occurs.

In the case that the mobile device 114 is compromised or not enrolled in step 406, the method 400 rejects the user request to access the website 158 in step 408, alerts the IT security operations center that the user request is rejected in step 410, and proceeds to step 412 to end in step 446 shown in FIG. 4C. Alternatively, the IT security operations center can be alerted in step 410 that the mobile device 114 is compromised or is not enrolled.

However, in the case that the mobile device 114 is not compromised and is enrolled in step 404, the method 400 then passes the request through the external WAF 130 and the reverse proxy 132 in step 414, and redirects the traffic to the VPN-Tunnel system 140 using the reverse proxy 132 in step 416. The method 400 validates the case that the request is for an internal website 158 internal website, such as https://home.company.com, on an intranet 122 of the organization, or for an Internet-based external website 126 in step 418 using the VPN-Tunnel system 140. The method 400 then uses the PAC file 142 to assess if the requested website is on the Internet or on an intranet 122 in step 420. By assessing where the requested website is located using the PAC file 142, the integrated networks system 100 establishes an appropriate proxy tunnel. If the proxy tunnel is to be established through the Internet, the method 400 proceeds to step 422 in FIG. 4B. Otherwise, the proxy tunnel is to be established through the intranet 122, and the method proceeds to step 424 in FIG. 4C.

Referring to FIG. 4B, after step 422, the Internet proxy 144 inspects the traffic to the Internet-based external website 126 in step 426. If the Internet-based external website 126 is blocked in step 428, the method 400 rejects the user request in step 430, and outputs a "BLOCKED" message to the user of the managed mobile device 114 in step 432. The "BLOCKED" message can be a text message displayed on the display of the mobile device 114. Alternatively, the "BLOCKED" message can be an audio message output by a speaker of the mobile device 114. The method 400 then proceeds to step 434 in FIG. 4C. Otherwise, when the Internet-based external website 126 is not blocked in step 428, the method 400 redirects the external website 126 to the managed mobile device 114 in step 436. The method 400 then proceeds to step 434 in FIG. 4C.

Referring to FIG. 4C, after step 424, the method 400 has one of the WAFs 130, 136 inspect the traffic in step 438. The method 400 determines if the traffic is safe in step 440. If the traffic is not safe in step 440, the request is rejected in step 442, and the method 400 outputs an "UNAVAILABLE" message to the user of the managed mobile device 114 in step 444. The "UNAVAILABLE" message can be a text message displayed on the display of the mobile device 114. Alternatively, the "UNAVAILABLE" message can be an audio message output by a speaker of the mobile device 114. The method 400 then ends in step 446. Otherwise, when the traffic is safe in step 440, the method 400 responds with the requested website 158 which is forwarded to the mobile device 114. The method 400 then ends in step 446. In addition, after step 412 in FIG. 4A and after step 434 in FIG. 4B, the method 400 ends in step 446.

Figure 5:
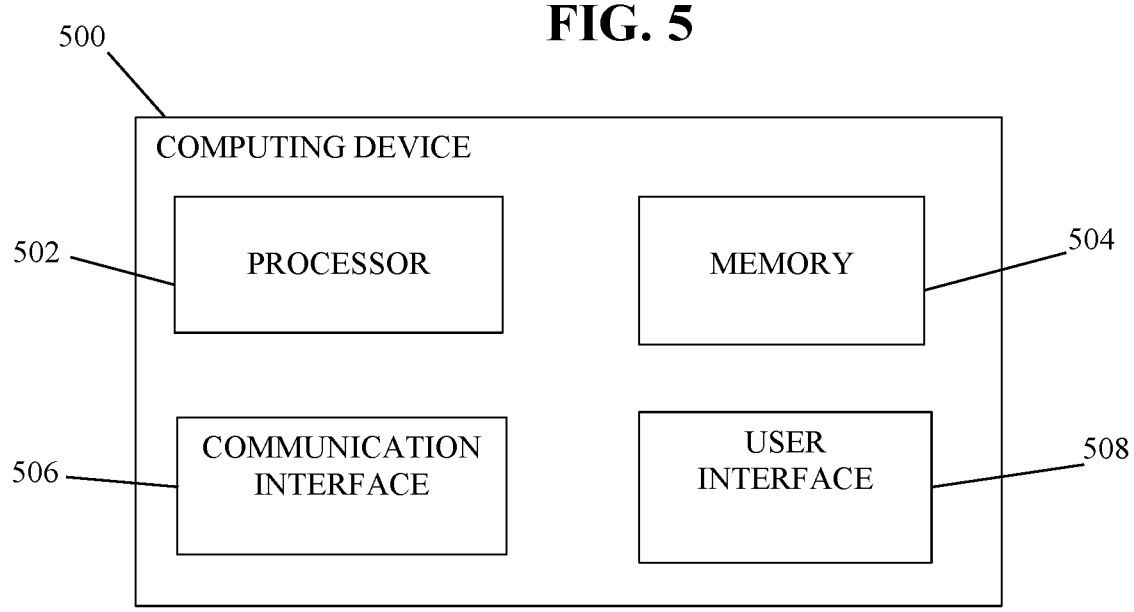
FIG. 5 is a schematic of a computing device used in the system of FIG. 1.

FIG. 5 illustrates a schematic of a computing device 500 including a processor 502 having code therein, a memory 504, and a communication interface 506. Optionally, the computing device 500 can include a user interface 508, such as an input device, an output device, or an input/output device. The processor 502, the memory 504, the communication interface 506, and the user interface 508 can be operatively connected to each other via any known connections, such as a system bus, a network, etc. Any component or combination of components of the integrated networks system 100 in FIGS. 1-2 can be implemented by a respective computing device 500. For example, each of the mobile devices 114, 116, 118, the first DMZ 112, the second DMZ 120, the internal network 122, the external web server 124, the reception firewall 128, the external WAF 130, the reverse proxy 132, the EMM system 134, the internal WAF 136, the internal firewall 138, the VPN-Tunnel system 140, the PAC file 142, the Internet proxy 144, the external firewall 146, the threat management system 148, the storage system 150, the logging system 152, the database system 154, and the internal web server 156 shown in FIGS. 1-2 can be implemented by a respective computing device 500 shown in FIG. 5 and described below.

It is to be understood that the computing device 500 can include different components. Alternatively, the computing device 500 can include additional components. In another alternative embodiment, some or all of the functions of a given component can instead be carried out by one or more different components. The computing device 500 can be implemented by a virtual computing device. Alternatively, the computing device 500 can be implemented by one or more computing resources in a cloud computing environment. Additionally, the computing device 500 can be implemented by a plurality of any known computing devices.

The processor 502 can be a hardware-based processor implementing a system, a sub-system, or a module. The processor 502 can include one or more general-purpose processors. Alternatively, the processor 502 can include one or more special-purpose processors. The processor 502 can be integrated in whole or in part with the memory 504, the communication interface 506, and the user interface 508. In another alternative embodiment, the processor 502 can be implemented by any known hardware-based processing device such as a controller, an integrated circuit, a microchip, a central processing unit (CPU), a microprocessor, a system on a chip (SoC), a field-programmable gate array (FPGA), or an application-specific integrated circuit (ASIC). In addition, the processor 502 can include a plurality of processing elements configured to perform parallel processing. In a further alternative embodiment, the processor 502 can include a plurality of nodes or artificial neurons configured as an artificial neural network. The processor 502 can be configured to implement any known artificial neural network, including a convolutional neural network (CNN).

The memory 504 can be implemented as a non-transitory computer-readable storage medium such as a hard drive, a solid-state drive, an erasable programmable read-only memory (EPROM), a universal serial bus (USB) storage device, a floppy disk, a compact disc read-only memory (CD-ROM) disk, a digital versatile disc (DVD), cloud-based storage, or any known non-volatile storage.

The code of the processor 502 can be stored in a memory internal to the processor 502. The code can be instructions implemented in hardware. Alternatively, the code can be instructions implemented in software. The instructions can be machine-language instructions executable by the processor 502 to cause the computing device 500 to perform the functions of the computing device 500 described herein. Alternatively, the instructions can include script instructions executable by a script interpreter configured to cause the processor 502 and computing device 500 to execute the instructions specified in the script instructions. In another alternative embodiment, the instructions are executable by the processor 502 to cause the computing device 500 to execute an artificial neural network. The processor 502 can be implemented using hardware or software, such as the code. The processor 502 can implement a system, a sub-system, or a module, as described herein.

The memory 504 can store data in any known format, such as databases, data structures, data lakes, or network parameters of a neural network. The data can be stored in a table, a flat file, data in a filesystem, a heap file, a B+ tree, a hash table, or a hash bucket. The memory 504 can be implemented by any known memory, including random access memory (RAM), cache memory, register memory, or any other known memory device configured to store instructions or data for rapid access by the processor 502, including storage of instructions during execution.

The communication interface 506 can be any known device configured to perform the communication interface functions of the computing device 500 described herein. The communication interface 506 can implement wired communication between the computing device 500 and another entity. Alternatively, the communication interface 506 can implement wireless communication between the computing device 500 and another entity. The communication interface 506 can be implemented by an Ethernet, Wi-Fi, Bluetooth, or USB interface. The communication interface 506 can transmit and receive data over a network and to other devices using any known communication link or communication protocol.

The user interface 508 can be any known device configured to perform user input and output functions. The user interface 508 can be configured to receive an input from a user. Alternatively, the user interface 508 can be configured to output information to the user. The user interface 508 can be a computer monitor, a television, a loudspeaker, a computer speaker, or any other known device operatively connected to the computing device 500 and configured to output information to the user. A user input can be received through the user interface 508 implementing a keyboard, a mouse, or any other known device operatively connected to the computing device 500 to input information from the user. Alternatively, the user interface 508 can be implemented by any known touchscreen. The computing device 500 can include a server, a personal computer, a laptop, a smartphone, or a tablet.

Advantages of the Integrated Networks System and Method

Using the split tunneling implemented by the integrated networks system 100 of FIGS. 1-2, a user of an associated mobile device 114, 116, 118 can securely access dissimilar security domains such as a public network including the Internet, and a LAN or a WAN at the same time using a single browser without modifying the mobile device 114, 116, 118, and using the same or different network connections. Accordingly, the integrated networks system 100 and methods 300, 400 attain a smooth user experience on the mobile devices 114, 116, 118 by automating web access to Internet-based and intranet-based websites. In addition, the secure organization browser can receive an external IP address or a URL of the external website 126, and automatically open the corresponding external website 126 on the browser which supports Data Leakage Prevention (DLP).

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including." "comprising." "having." "containing." "involving." and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting.

Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An integrated networks system operatively connected to an internal web server configured as a private network device storing an internal website, operatively connected to an external web server configured as a public network device storing an external website, and operatively connected to a mobile device configured to execute a single browser, the integrated networks system configured to receive traffic from the mobile device sending a request to access to the internal and external websites, and the integrated networks system is configured to implement split tunneling to the internal and external web server, comprising:
   a reception firewall operatively connected to the mobile device;
   an external web application firewall (WAF) operatively connected to the reception firewall;
   a reverse proxy operatively connected to the external WAF;
   an enterprise mobility management (EMM) system operatively connected to the reverse proxy, wherein the EMM system includes:
      a VPN-Tunnel system configured to validate the request; and
      a proxy auto-config (PAC) system;
   an Internet proxy operatively connected to the EMM system;
   an external firewall operatively connected to the Internet proxy, and operatively connected to the external web server;
   an internal WAF operatively connected to the EMM system; and
   an internal firewall operatively connected to the internal WAF and to the internal web server,
   wherein the PAC system is configured to choose one of the Internet proxy and the reverse proxy,
   wherein the internal firewall, the reception firewall, the external and internal WAFs, the EMM system, the Internet proxy, and the reverse proxy are configured to implement a secure split tunneling of the mobile device to the internal and external web servers, and
   wherein a single browser connection is established between the mobile device and one of the internal and external web servers, thereby permitting access by the mobile device to one of the internal and external websites using only the single browser by the secure split tunneling.

2. The integrated networks system of claim 1, wherein the PAC system includes a PAC file storing at least one rule.

3. The integrated networks system of claim 2, wherein the EMM system is configured to execute the PAC file to perform the at least one rule in the PAC file, and
   wherein the EMM system, executing the PAC file, automatically chooses one of the reverse proxy and the Internet proxy to obtain a Uniform Resource Locator (URL) of the internal website or the external website, respectively.

4. The integrated networks system of claim 1, wherein the internal web server is configured to be a network device of an intranet of an organization.

5. The integrated networks system of claim 1, wherein the external web server is configured to be a network device of the Internet.

6. The integrated networks system of claim 1, wherein the VPN-Tunnel system is configured to validate the case that the request is directed to the internal web server to access the internal website.

7. The integrated networks system of claim 1, wherein the VPN-Tunnel system is configured to validate the case that the request is directed to the external web server to access the external website.

8. A method, comprising:
   providing an integrated networks system operatively connected to an internal web server configured as a private network device storing an internal website, operatively connected to an external web server configured as a public network device storing an external website, and operatively connected to a mobile device configured to send a request to access to the internal and external websites, wherein the integrated networks system includes an internal firewall, a reception firewall, an external web application firewall (WAF), an internal WAF, an Internet proxy, a reverse proxy, and an enterprise mobility management (EMM) system including a VPN-Tunnel system and a proxy auto-config (PAC) system;
   receiving the request at the integrated networks system;
   passing the request through the reception firewall, the external WAF, and the reverse proxy;
   validating the request, using the VPN-Tunnel system, for the case that the request is directed to the internal web server to access the internal website or directed to the external web server to access the external website;
   implementing a secure split tunneling of the mobile device to the internal and external web servers; and
   accessing the internal and external websites by the mobile device using only one browser.

9. The method of claim 8, further comprising:
   determining the case that the mobile device is compromised or not enrolled with the integrated networks system; and
   rejecting the request.

10. The method of claim 9, further comprising:
    determining the case that the mobile device is not compromised and is enrolled with the integrated networks system; and
    redirecting the request to a public domain name system (DNS) of the organization and to an Internet Protocol (IP) address.

11. The method of claim 10, further comprising:
    prior to validating the request, redirecting traffic between the mobile device and the internal and external servers to the VPN-Tunnel system.

12. The method of claim 11, further comprising:
    choosing one of the Internet proxy and the reverse proxy using the PAC system.

13. The method of claim 11, further comprising:
    storing a PAC file having at least one rule in the PAC system;
    executing the PAC file by the EMM system to perform the at least one rule;
    automatically choosing one of the reverse proxy and Internet proxy; and obtaining a Uniform Resource Locator (URL) of the internal website or the external website, respectively.

14. The method of claim 13, further comprising:

in the case that the Internet proxy is chosen, determining the case that an Internet-based website is not blocked; and redirecting the requested website to the mobile device.

15. The method of claim 13, further comprising:

in the case that the reverse proxy is chosen, determining the case that the traffic is safe; and responding to the request with the requested website sent to the mobile device.

\* \* \* \* \*